Jan. 12, 1937. M. SITAŘ 2,067,292
INTERNAL COMBUSTION ENGINE
Filed Jan. 9, 1935 4 Sheets-Sheet 1

Inventor:
Miroslav Sitař

Inventor:
Miroslav Sitař

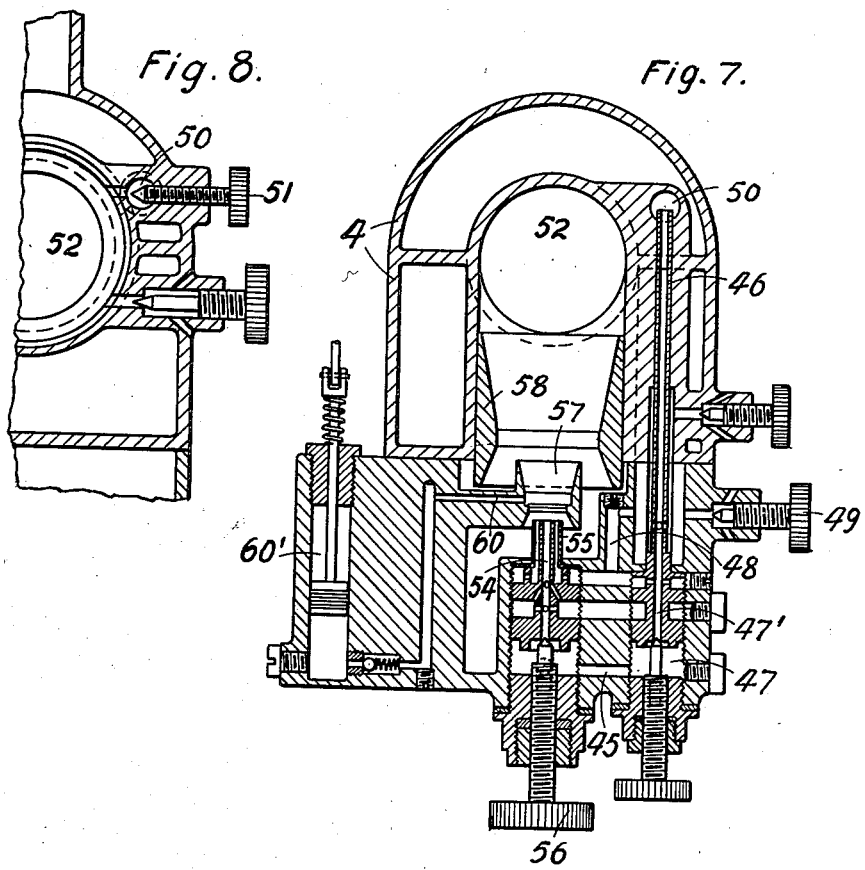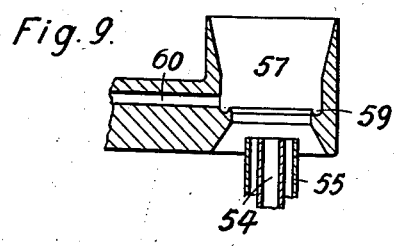

Jan. 12, 1937  M. SITAŘ  2,067,292
INTERNAL COMBUSTION ENGINE
Filed Jan. 9, 1935  4 Sheets-Sheet 4
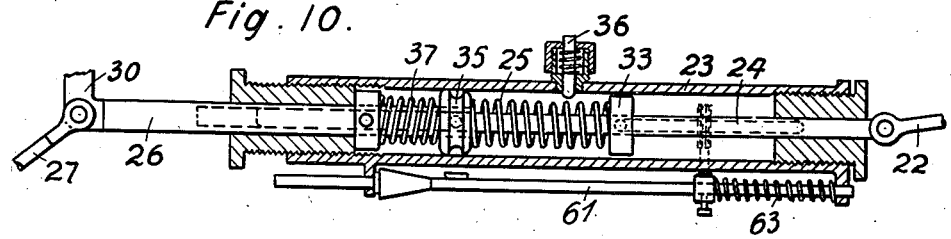
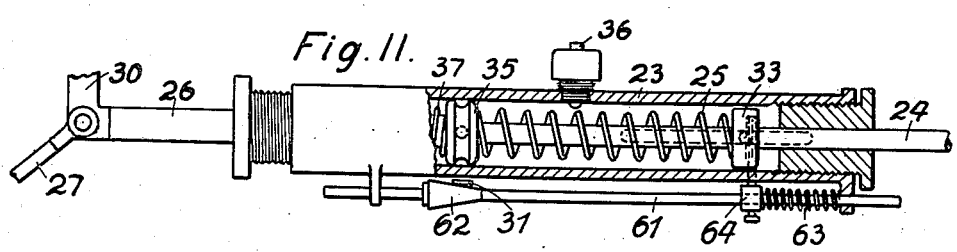
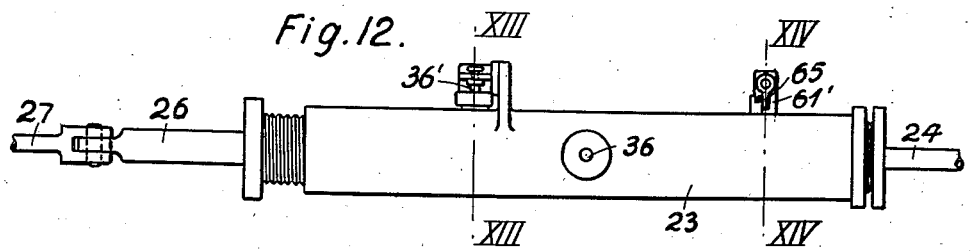
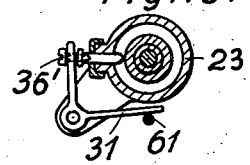
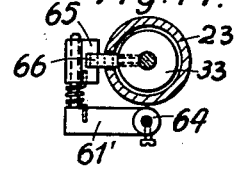
Inventor:
Miroslav Sitař

Patented Jan. 12, 1937

2,067,292

UNITED STATES PATENT OFFICE 2,067,292

INTERNAL COMBUSTION ENGINE

Miroslav Sitař, Prague, Czechoslovakia

Application January 9, 1935, Serial No. 1,030
In Czechoslovakia December 6, 1934

9 Claims. (Cl. 123—127)

The subject matter of the invention is an apparatus for working explosion engines with heavy fuels, by means of which any two or four-stroke explosion low-pressure engine can be worked with heavy motive substances, for example petroleum, naphtha, kerosene, gas oil and the like, without the engine suffering or losing its power through injurious influences such as fouling of the sparking plugs, dirtying of the valves and fouling and decomposition of the oil in the engine casing, on account of incomplete combustion of the gas substance.

Figure 1:
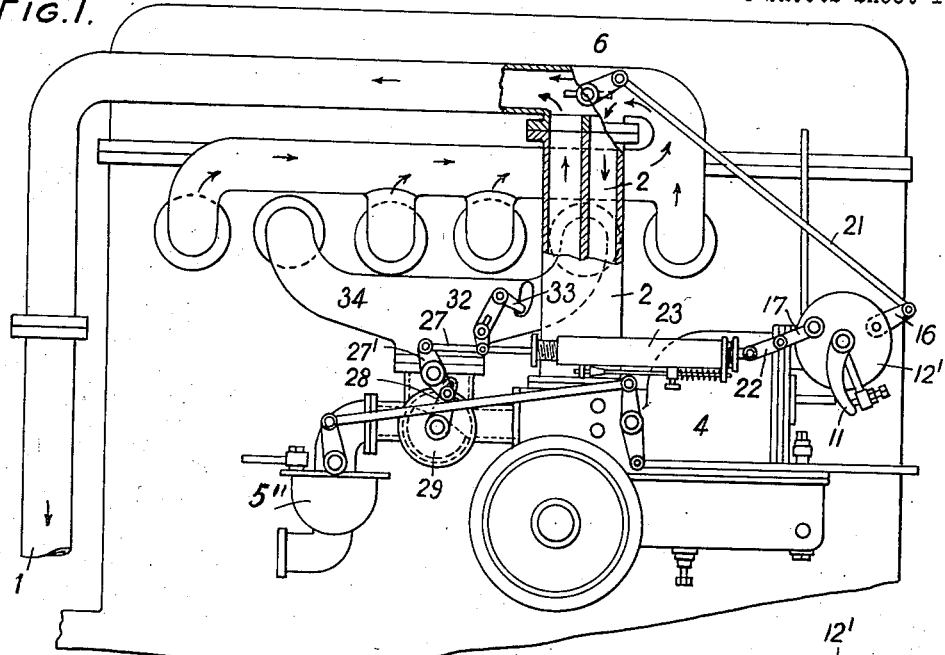
Figure 3:
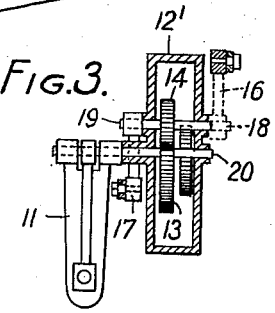
Figure 2:
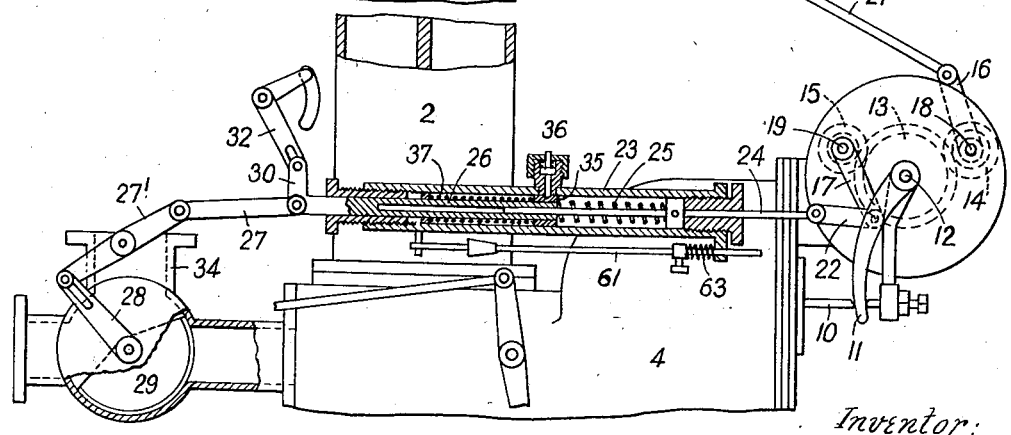
Figure 4:
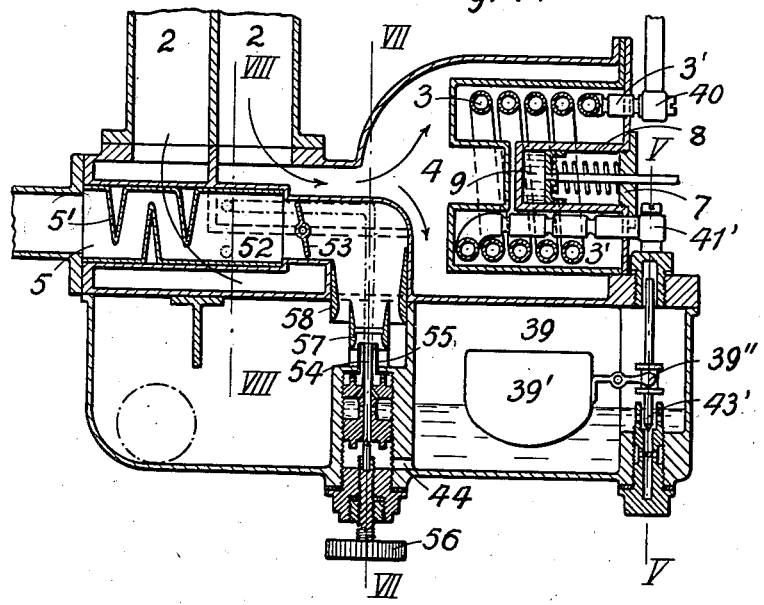
Figure 5:
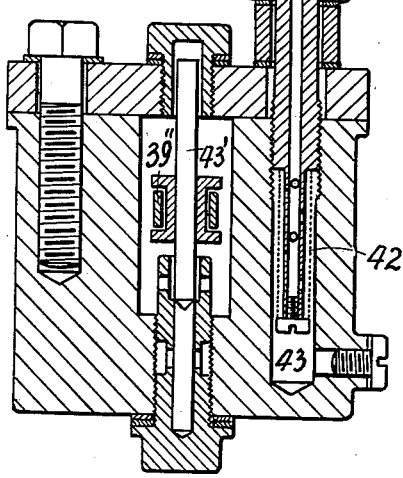
Figure 6:
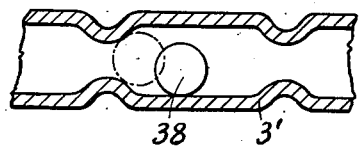

The invention is represented by way of example in the accompanying drawings, of which:

Fig. 1 shows, in side view and partial section, a complete arrangement of the apparatus connected to the engine, the transmission gear levers and rods being omitted, Fig. 2 is a fragmentary side view partly in section, Fig. 3 is an axial section of a valve operating element, Fig. 4 is a vertical section through the fuel feed and carburetting system, Fig. 5 is a section on the line V—V of Fig. 4, Fig. 6 is a fragmentary longitudinal section of one of the fuel pipes, Fig. 7 is a section on the line VII—VII of Fig. 4, Fig. 8 is a section on the line VIII—VIII of Fig. 4, Fig. 9 shows part of Fig. 7 on an enlarged scale, Fig. 10 is a longitudinal section of one of the valve operating elements, Fig. 11 is a similar view showing a different relative position of the members, Fig. 12 is an elevation of the same valve operating element, seen at right angles to Fig. 11, Fig. 13 is a section on the line XIII—XIII of Fig. 12, and Fig. 14 is a section on the line XIV—XIV of Fig. 12.

The apparatus comprises a heating chamber 4 which is connected to the exhaust pipe 1 by means of a two-way attachment 2, through one path of which the exhaust gases enter and through the other part of which they leave the heating chamber. The latter is so subdivided that the gases first pass through a part of the chamber containing a radiator 3, for heating the oil, and they then pass through the second part of the heating chamber 4 for heating a gas radiator 5 arranged in this part. From this part of the heating chamber 4, the exhaust gases return into the exhaust pipe 1 through the second path in the attachment 2. The radiators 3 and 5 absorb the heat of the exhaust gases, and the fuel passing through these radiators will be heated, the liquid in the radiator 3 and the atomized gas mixture in the radiator 5. In the exhaust pipe 1 above the attachment 2, there is arranged a regulating valve 6 which regulates the quantity of gas going through the heating chamber 4. When the valve 6 is in the vertical position, the maximum quantity of exhaust gases passes through the apparatus or the chamber 4 and the radiators are rapidly heated. When the regulating valve 6 is brought into its horizontal position (Fig. 1), the exhaust gases go straight through the exhaust pipe without touching the heating chamber 4, and the heating of the radiator bodies 3 and 5 ceases. The regulating valve 6 is opened and closed automatically by means of a heat regulator 7 of any desired kind, which is arranged in the space of the radiator body 3. The heat regulator consists, for example, of a brass vessel 8 in which a heat-responsive fluid is arranged behind a piston 9 the rod 10 of which presses on a one-armed lever 11 that is rotatable on a shaft 12. The shaft 12 is rigidly connected with the toothed wheel 13 which transmits the movement of the lever 11 to the arms 16 and 17 through the medium of pinions 14 and 15. These pinions are rigidly connected to the arms and are rotatably mounted on the shafts 18 and 19. The heat regulator 7 effects the movement of the levers 11, 16 and 17 in one direction of movement, whilst the movement of these levers in the other direction is effected by means of a spring 20 which is secured at one end to the shaft 12 and at the other end to the toothed wheel 13. The deflection of the lever 16 is transmitted to the regulating valve 6 by means of the connecting rod 21. When a certain temperature is reached in the space of the radiator body the heat regulator 7, by means of the hereinbefore described mechanism, acts upon the regulating valve 6 which diverts the supply of exhaust gases to the heating chamber either partially or wholly.

The engine is started with light fuel, and the lever 17 is utilized for the automatic change-over from one kind of fuel to the other. The lever is connected by means of a link 22 to a rod 24 which is coaxial with and telescopes within a rod 26. Both rods are guided within a rigidly mounted sleeve 23 and controlled by springs 25 and 37. The spring 25 bears at one end against a collar 33 on the rod 24 and at the other end against the end of the rod 26. The spring 37 bears against a collar 35 on the rod 26 and controls the latter. The rod 26 is connected by means of a link 27 and a double-armed lever 27' to the operating arm 28 of a three-way valve 29 through the medium of which the induction pipe 34 of the engine can be connected either to a carburetor 5" for feeding light fuel into the engine or to a carburetor in the chamber 4 for supplying the heavy fuel oil. A spring pin 36 mounted in the sleeve 23 engages normally in a circumferential groove in the collar 35 and maintains the valve 29 in the position shown in Fig. 2 for supplying light fuel. Another spring pin 36' (Fig. 12) is adapted to engage the collar 35 for maintaining the valve 29 in position to supply heavy fuel oil. An arm 30 on the rod 26 is operated to turn a switch lever 32 for changing an electric signaling light from one color to another to indicate whether the engine is working on light or heavy fuel.

In starting with cool engine the position of the regulating elements is as shown in Fig. 2, and light fuel will be fed to the engine. The exhaust gases will be led by the valve 6 through the heating chamber 4 and heat the latter.

When the temperature in the radiator reaches such a value that the heavy fuel is capable of being gasified, the heat regulator 7 acts upon the lever 11 which, by means of the toothed wheel 13, turns the pinion 15 and thus also deflects the lever 17 which, in turn, transmits the movement to the fuel regulator by means of the link 22. The rod 24 compresses the spring 25 and, when the compression has reached a certain degree, it liberates the collar 35 which is held by the pin 36 and which then pushes against the shock-damping spring 37. The rod 26 participates in the movement of the collar and acts upon the valve 29 which shuts off the supply of the light fuel and admits the supply of the gasified heavy fuel into the inlet pipe 34 of the engine. The rod 26 at the same time operates the change-over switch 32 which gives the signal that the engine has been changed over to working with heavy fuel.

The valve 29 is retained in its new position by the engagement of the spring pin 36' with the grooved collar 35, and the rod 26 thus leaves the rod 24 full freedom of movement, so that the valve 6, which is turned into the open position shown in Fig. 1 at the same time as the position of the valve 29 is reversed, can be operated by the thermal element for regulating the heating of the radiator.

The spring pin 36' is engaged by a bell crank 31 (Fig. 13) which normally bears against a cone 62 mounted on a rod 61 and operative to maintain the pin 36' in inoperative position. The rod 61 is axially slidable in brackets carried by the sleeve 23 and is controlled by a spring 63 which bears against a collar 64 on the rod and tends to move the cone 62 out of contact with the bell crank. On the collar 64 there is an arm 61' which carries, on an upright pin, a spring-controlled vane 65. The collar 33 is fitted with a pin 66 (Fig. 14) which projects through an elongated slot in the sleeve 23 into the path of the vane 65. Normally the cone 62 is retained by the pin 66 in operative position, but when the rod 24 moves into the position shown in Fig. 10 for changing over from light to heavy fuel, the rod 61 is released, and the cone is then moved by the spring 63 out of contact with the bell crank 31, so that the pin 36' will be free to engage the collar 35 and secure the valve 29 in reversed position. While the engine is working, the collar 33 is free to move under the influence of the thermal element without contacting with the vane 65, but when the engine is stopped and cools down, the vane will eventually be engaged by the pin 66, and the cone 62 will be restored to its normal position. When this happens the bell crank 31 will be operated for releasing the collar 35, and the position of the valve 29 and the switch 32 will be reversed.

The pipes of the radiator 3 are arranged in their own divided-off portion of the heating chamber 4. They are consequently not heated directly by the exhaust gases, with the result that the heating or cooling off is uniform. The hermetically closed radiator space obviates danger of fire or explosion if the radiator tubes should be injured by accident. The helically twisted radiator pipe merges into a pipe 3' which is provided with circumferential corrugations adapted to co-operate with ball valves 38 for protecting the float chamber from sudden fluctuations of pressure.

The heavy fuel is fed through the rotatable connecting piece 40 into the radiator 3, 3', from which it then, after being heated, passes into the channel 43 through the rotatable connecting piece 41 and the sieve 42 arranged above the latter, and then into the float chamber 39 through a conical closure in which the float spindle 43' moves. The supply of fuel through the needle valve is regulated by the float 39 which is mounted in the float chamber by means of its pivot 39". The fuel flows from the float chamber into the channel 44 from which it is delivered in three independent gasification currents that form the gasification system—i. e., for the gasification of the motive substance at a low, normal and high speed of the engine. The supply of the fuel for gasification at low engine speed is passed through the connecting piece 47 by means of the regulating cone 47' through the connecting channel 45 from which the carburetor tube 46 for the low and normal engine speed is fed. When the engine is overloaded at low pressure, the correcting carburetor tube 48 is useful by automatically adding motive substance. From the connecting channel 45, the fuel is passed into the gasification tube 46 into which air is sucked through the throttle screw 49 which regulates the quantity of this air. The gasified fuel comes into the suction pipe 52 through the channel 50 and the throttle screw 51. The regulating screw 51 regulates the low engine speed and is independent of the throttle valve 53. At normal engine speed, the fuel comes out of the connecting channel 45 into the main gasification tube 54. This tube is double and is in the form of an intermediate circuit:—The inner gasification tube 54 and the outer auxiliary gasification tube 55. The inner tube 54 gasifies the fuel at high engine speed whilst the outer one assists at normal engine speed. The supply of the necessary quantity of fuel at rapid engine speed is regulated by the cone valve 56. The fuel that is prepared for gasification in the gasification tube 54, 55 is sucked into the atomizing cup 57 through the suction connection 58. This connection is tapered and serves for concentrating and rapidly carrying over the already prepared fuel into the mixing cup 57. On the inner periphery of the suction connection 58 there is arranged a channel 59 which communicates by means of the bore 60 with a pump by means of which fuel is added as required from the float chamber 39 with the aid of the accelerator lever (not shown). The atomized motive mixture comes through the atomizing cup into the radiator body 5 through the throttle valve 53. From the radiator body, the completely gasified mixture comes into the suction pipe 34 through the slide valve 29.

The radiator 5 consists of a pipe containing wedge-shaped hollow baffles 5' which are inset in the draught pipe and which at one side abstract heat from the exhaust gases for the purpose of giving this heat up to the mixture passing through the interior. If condensation of the mixture should take place, the condensate will be intercepted by the baffles and passed on to the bottom of the radiator pipe where it is regasified for delivery to the induction pipe.

I claim:

1. An apparatus for working an internal combustion engine with heavy fuels, comprising a heating chamber, two radiator bodies in said heating chamber and arranged to have the exhaust gas pass closely by them, said radiator bodies being adapted to abstract heat from the exhaust gas and to give it up to their interior, one of said radiator bodies being adapted to heat the fuel passing therethrough, being arranged in an hermetically closed space divided off from the rest of said heating chamber and consisting of a helically twisted tube and a corrugated tube into which said helically twisted tube merges, and the other of said radiator bodies being adapted to gasify the fuel passing therethrough, ball valves in said corrugated tube, a branch pipe connecting said heating chamber with the exhaust pipe of the engine, a regulating valve arranged in front of the inlet to said branch pipe, a fuel valve adapted to cause a light or heavy fuel to be fed to the suction pipe of the engine as required, and a heat regulator adapted to act simultaneously on said regulating valve and said fuel valve and to cause said regulating valve to regulate the passage of the exhaust gas through said heating chamber.

2. An apparatus for working an internal combustion engine with heavy fuels, comprising a heating chamber, two radiator bodies in said heating chamber and arranged to have the exhaust gas pass closely by them, said radiator bodies being adapted to abstract heat from the exhaust gas and to give it up to their interior, one of said radiator bodies being adapted to heat the fuel passing therethrough and the other of said radiator bodies being adapted to gasify the fuel passing therethrough and consisting of a tube, wedge shaped baffles in said tube, a branch pipe connecting said heating chamber with the exhaust pipe of the engine, a regulating valve arranged in front of the inlet to said branch pipe, a fuel valve adapted to cause a light or heavy fuel to be fed to the suction pipe of the engine as required, and a heat regulator adapted to act simultaneously on said regulating valve and said fuel valve and to cause said regulating valve to regulate the passage of the exhaust gases through said heating chamber.

3. An apparatus for working an internal combustion engine with heavy fuels, comprising a heating chamber, two radiator bodies in said heating chamber and arranged to have the exhaust gas pass closely by them, said radiator bodies being adapted to abstract heat from the exhaust gas and to give it up to their interior, one of said radiator bodies being adapted to heat the fuel passing therethrough and the other of said radiator bodies being adapted to gasify the fuel passing therethrough, a branch pipe connecting said heating chamber with the exhaust pipe of the engine, a regulating valve arranged in front of the inlet to said branch pipe, a fuel valve adapted to cause a light or heavy fuel to be fed to the suction pipe of the engine as required, a heat regulator adapted to act simultaneously on said regulating valve and said fuel valve and to cause said regulating valve to regulate the passage of the exhaust gas through said heating chamber, a gasification pipe, two regulating devices each of which is adapted to work independently and automatically so as to enable the supply of the fuel into said gasification pipe through the injection pipes to be effected at low, normal and high engine speeds, and hand-regulated cone valves adapted to regulate the supply of the fuel mixture through the injection tubes.

4. An apparatus for working an internal combustion engine with heavy fuels, comprising a heating chamber, two radiator bodies in said heating chamber and arranged to have the exhaust gas pass closely by them, said radiator bodies being adapted to abstract heat from the exhaust gas and to give it up to their interior, one of said radiator bodies being adapted to heat the fuel passing therethrough and the other of said radiator bodies being adapted to gasify the fuel passing therethrough, a branch pipe connecting said heating chamber with the exhaust pipe of the engine, a regulating valve arranged in front of the inlet to said branch pipe, a fuel valve adapted to cause a light or heavy oil to be fed to the suction pipe as required, a suction connection having a channel adapted to deliver a greater quantity of fuel as the speed of the engine is increased, and a heat regulator adapted to act simultaneously on said regulating valve and said fuel valve and to cause said regulating valve to regulate the passage of the exhaust gas through said heating chamber.

5. An apparatus for working an internal combustion engine with heavy fuels, comprising a heating chamber, two radiator bodies in said heating chamber and arranged to have the exhaust gas pass closely by them, said radiator bodies being adapted to abstract heat from the exhaust gas and to give it up to their interior, one of said radiator bodies being adapted to heat the fuel passing therethrough, being arranged in an hermetically closed space divided off from the rest of said heating chamber and consisting of a helically twisted tube and a corrugated tube into which said helically twisted tube merges, and the other of said radiator bodies being adapted to gasify the fuel passing therethrough, ball valves in said corrugated tube, a branch pipe connecting said heating chamber with the exhaust pipe of the engine, a regulating valve arranged in front of the inlet to said branch pipe, a fuel valve adapted to cause a light or heavy fuel to be fed to the suction pipe of the engine as required, a suction connection having a channel adapted to deliver a greater quantity of fuel as the speed of the engine is increased, and a heat regulator adapted to act simultaneously on said regulating valve and said fuel valve and to cause said regulating valve to regulate the passage of the exhaust gas through said heating chamber.

6. An apparatus for working an internal combustion engine with heavy fuels, comprising a heating chamber, two radiator bodies in said heating chamber and arranged to have the exhaust gas pass closely by them, said radiator bodies being adapted to abstract heat from the exhaust gas and to give it up to their interior, one of said radiator bodies being adapted to heat the fuel passing therethrough and the other of said radiating bodies being adapted to gasify the fuel passing therethrough and consisting of a tube, wedge-shaped baffles in said tube, a branch pipe connecting said heating chamber with the exhaust pipe of the engine, a regulating valve arranged in front of the inlet to said branch pipe, a fuel valve adapted to cause a light or heavy fuel to be fed to the suction pipe of the engine as required, a suction connection having a channel adapted to deliver a greater quantity of fuel as the speed of the engine is increased, and a heat regulator adapted to act simultaneously on said regulating valve and said fuel valve and to cause said regulating valve to regulate the passage of the exhaust gas through said heating chamber.

7. An apparatus for working an internal combustion engine with heavy fuels, comprising a heating chamber, two radiator bodies in said heating chamber and arranged to have the exhaust gas pass closely by them, said radiator bodies being adapted to abstract heat from the exhaust gas and to give it up to their interior, one of said radiator bodies being adapted to heat the fuel passing therethrough and the other of said radiator bodies being adapted to gasify the fuel passing therethrough, a branch pipe connecting said heating chamber with the exhaust pipe of the engine, a regulating valve arranged in front of the inlet to said branch pipe, a fuel valve adapted to cause a light or heavy fuel to be fed to the suction pipe of the engine as required, a suction connection having a channel adapted to deliver a greater quantity of fuel as the speed of the engine is increased, a heat regulator adapted to act simultaneously on said regulating valve and said fuel valve and to cause said regulating valve to regulate the passage of the exhaust gas through said heating chamber, a gasification pipe, two regulating devices each of which is adapted to work independently and automatically so as to enable the supply of the fuel into said gasification pipe through the injection pipes to be effected at low, normal and high engine speeds, and hand-regulated cone valves adapted to regulate the supply of the fuel mixture through the injection tubes.

8. An apparatus for working an internal combustion engine with heavy fuels, comprising a heating chamber, two radiator bodies in said heating chamber and arranged to have the exhaust gas pass closely by them, said radiator bodies being adapted to abstract heat from the exhaust gas and to give it up to their interior, one of said radiator bodies being adapted to heat the fuel passing therethrough and the other of said radiator bodies being adapted to gasify the fuel passing therethrough, a branch pipe connecting said heating chamber with the exhaust pipe of the engine, a regulating valve arranged in front of the inlet to said branch pipe, a fuel valve adapted to cause a light or heavy fuel to be fed to the suction pipe of the engine as required, a heat regulator arranged in said fuel-heating radiator body and adapted to act simultaneously on said regulating valve and said fuel valve and to cause said regulating valve to regulate the passage of the exhaust gas through said heating chamber, heat-responsive means in said heat regulator, a single-armed lever adapted to be moved by said heat-responsive means, regulating levers operatively connected to said regulating valve and said fuel valve, and interengaging toothed wheels arranged to transmit the movement of said single-armed lever to said regulating levers.

9. An apparatus for working an internal combustion engine with heavy fuels, comprising a heating chamber, two radiator bodies in said heating chamber and arranged to have the exhaust gas pass closely by them, said radiator bodies being adapted to abstract heat from the exhaust gas and to give it up to their interior, one of said radiator bodies being adapted to heat the fuel passing therethrough and the other of said radiator bodies being adapted to gasify the fuel passing therethrough, a branch pipe connecting said heating chamber with the exhaust pipe of the engine, a regulating valve arranged in front of the inlet to said branch pipe, a fuel valve adapted to cause a light or heavy fuel to be fed to the suction pipe of the engine as required, a heat regulator adapted to simultaneously move said regulating valve and said fuel valve and to cause said regulating valve to regulate the passage of the exhaust gas through said heating chamber, mechanism for transmitting said simultaneous movement to said regulating valve and said fuel valve, and connected to said mechanism, a fuel regulator comprising a sleeve, a rod displaceably mounted in said sleeve, a spring on said rod, a hollow rod into the cavity of which the first mentioned rod extends, a collar acted upon by said spring and connected to said hollow rod, a third rod connecting said collar to said fuel valve, a lever of an electrical change-over switch, an arm and spring connecting said hollow rod to said lever of said electrical change-over switch, and spring pins adapted to secure the two first mentioned rods in their two end positions, said two first mentioned rods being adapted to act upon each each other only when the pressure of the first mentioned spring has reached a predetermined value.

MIROSLAV SITAŘ.